United States Patent
Witts et al.

(10) Patent No.: US 12,013,264 B2
(45) Date of Patent: Jun. 18, 2024

(54) POSITION SENSING APPARATUS AND METHOD

(71) Applicant: Kyocera AVX Components (Werne) GmbH, Werne (DE)

(72) Inventors: David Witts, Cambridge (GB); Peter Constantinou, Cambridge (GB); Paul Smith, Cambridge (GB); Timothy Biggs, Cambridge (GB); Andrew Parker, Cambridge (GB)

(73) Assignee: KYOCERA AVX COMPONENTS (WERNE) GMBH, Werne (DE)

( * ) Notice: Subject to any disclaimer, the term of this patent is extended or adjusted under 35 U.S.C. 154(b) by 0 days.

(21) Appl. No.: 17/286,119

(22) PCT Filed: Oct. 16, 2018

(86) PCT No.: PCT/GB2018/052978
§ 371 (c)(1),
(2) Date: Apr. 16, 2021

(87) PCT Pub. No.: WO2020/079384
PCT Pub. Date: Apr. 23, 2020

(65) Prior Publication Data
US 2021/0381853 A1 Dec. 9, 2021

(51) Int. Cl.
*G01D 5/20* (2006.01)
*G01B 7/00* (2006.01)

(52) U.S. Cl.
CPC ........... *G01D 5/2053* (2013.01); *G01B 7/003* (2013.01)

(58) Field of Classification Search
CPC ........ G01D 5/20; G01D 5/204; G01D 5/2046; G01D 5/2053; G01D 5/22; G01D 5/2208; G01B 7/003
See application file for complete search history.

(56) References Cited

U.S. PATENT DOCUMENTS

| | | |
|---|---|---|
| 4,739,272 A | 4/1988 | Griffin et al. |
| 4,820,961 A | 4/1989 | McMullin |

(Continued)

FOREIGN PATENT DOCUMENTS

| | | |
|---|---|---|
| CN | 1950676 A | 4/2007 |
| DE | 102008012922 | 9/2009 |

(Continued)

OTHER PUBLICATIONS

International Search Report for PCT/GB2018/052978, dated Jun. 24, 2019, 2 pages.

(Continued)

*Primary Examiner* — Steven L Yeninas
(74) *Attorney, Agent, or Firm* — Dority & Manning, P.A.

(57) ABSTRACT

Position sensing apparatus is provided. In one example implementation, the position sensing apparatus comprises a first member having an excitation conductive winding and a detection conductive winding formed thereon, and a second member having a resonant circuit formed thereon. An integrated circuit comprising excitation signal generation and detection signal processing circuitry is arranged to generate an alternating excitation signal at a resonant frequency of the resonant circuit and to process an alternating detection signal induced in the detection conductive winding as a result of a magnetic field generated by the alternating excitation signal flowing through the excitation conductive winding, and the excitation conductive winding and the detection conductive winding are arranged so that the detection signal varies in dependence on the relative position of the first and second member. Phase-shift circuitry is arranged to introduce a phase shift to one of the excitation signal and the detection signal such that the excitation signal output by the integrated circuit and the detection signal input (Continued)

to the detection circuit are in phase or in anti-phase with each other.

11 Claims, 4 Drawing Sheets

(56) References Cited

U.S. PATENT DOCUMENTS

| | | | |
|---|---|---|---|
| 5,003,260 | A | 3/1991 | Auchterlonie |
| 5,265,480 | A | 11/1993 | Tsuji et al. |
| 5,592,078 | A * | 1/1997 | Giragosian ........ G01N 29/2412 |
| | | | 318/576 |
| 5,815,091 | A | 9/1998 | Dames et al. |
| 6,002,250 | A * | 12/1999 | Masreliez ............ G01D 5/2053 |
| | | | 324/207.16 |
| 6,011,389 | A | 1/2000 | Masreliez et al. |
| 6,124,708 | A | 9/2000 | Dames |
| 6,642,710 | B2 | 11/2003 | Morrison et al. |
| 7,196,604 | B2 | 3/2007 | Sills et al. |
| 7,208,945 | B2 | 4/2007 | Jones et al. |
| 7,298,137 | B2 | 11/2007 | Howard et al. |
| 7,319,319 | B2 | 1/2008 | Jones et al. |
| 7,451,658 | B2 | 11/2008 | Sills et al. |
| 7,528,597 | B2 | 5/2009 | Taylor et al. |
| 7,868,609 | B2 | 1/2011 | Zhitomirskiy |
| 9,453,934 | B2 | 9/2016 | Hughes |
| 9,835,473 | B2 | 12/2017 | Nahum |
| 9,958,480 | B2 | 5/2018 | Nejatali et al. |
| 10,698,544 | B2 | 6/2020 | Staszak et al. |
| 10,856,452 | B1 | 12/2020 | Fiori, Jr. |
| 2001/0020846 | A1* | 9/2001 | Miyata ................. G01D 5/2093 |
| | | | 324/207.17 |
| 2001/0029329 | A1 | 10/2001 | Avrin et al. |
| 2002/0089326 | A1* | 7/2002 | Morrison ................. G01B 7/02 |
| | | | 324/207.17 |
| 2005/0225320 | A1 | 10/2005 | Lee |
| 2009/0174396 | A1 | 7/2009 | Howard |
| 2009/0184707 | A1 | 7/2009 | Luetzow |
| 2010/0072987 | A1* | 3/2010 | Nakano ................ G01D 5/2046 |
| | | | 324/207.15 |
| 2011/0109303 | A1 | 5/2011 | Zhitomirsky |
| 2011/0204883 | A1 | 8/2011 | Konno et al. |
| 2011/0291780 | A1 | 12/2011 | Takahashi et al. |
| 2012/0176123 | A1 | 7/2012 | Manabe et al. |
| 2013/0043863 | A1 | 2/2013 | Ausserlechner et al. |
| 2013/0069637 | A1 | 3/2013 | Kobayashi et al. |
| 2014/0167788 | A1 | 6/2014 | Fontanet |
| 2014/0327432 | A1 | 11/2014 | Elliott et al. |
| 2015/0109001 | A1* | 4/2015 | Singh ..................... G01B 7/003 |
| | | | 324/656 |
| 2016/0363463 | A1* | 12/2016 | Niwa ........................ G01D 5/22 |
| 2017/0041168 | A1* | 2/2017 | Shimizu ................ H04L 7/0008 |
| 2017/0250701 | A1* | 8/2017 | Hiroshima ............... G01B 7/30 |
| 2017/0307411 | A1 | 10/2017 | Elliott |
| 2017/0307412 | A1 | 10/2017 | Elliott et al. |
| 2018/0224301 | A1 | 8/2018 | Herrmann et al. |
| 2019/0056244 | A1 | 2/2019 | Elliott et al. |
| 2019/0056251 | A1 | 2/2019 | Elliot et al. |
| 2019/0063954 | A1 | 2/2019 | Elliott |
| 2020/0011394 | A1 | 1/2020 | Nardemann et al. |

FOREIGN PATENT DOCUMENTS

| | | |
|---|---|---|
| DE | 102015220650 | 4/2017 |
| EP | 0743508 | 11/1996 |
| EP | 2881715 | 6/2015 |
| JP | 2016-109569 | 6/2016 |
| WO | WO 2005/098370 | 4/2005 |
| WO | WO 2008/032008 | 3/2008 |
| WO | WO 2009/153580 | 12/2009 |
| WO | WO 2014/053836 | 4/2014 |
| WO | WO 2015140080 | 9/2015 |

OTHER PUBLICATIONS

Chinese Office Action with English translation from Application No. CN 202010406616.4 dated Dec. 6, 2021, 32 pages.
English machine translation of the detailed description of JP2016109569A to Katsuyoshi , obtained from https://worldwide.espacenet.com/advancedSearch?locale=en_ep, obtained on Dec. 4, 2021 (Year: 2021), 7 pages.
PCT International Search Report and Written Opinion for corresponding PCT Application No. PCT/GB2019/053109, mailed on Jan. 16, 2020, 12 pages.
PCT International Search Report and Written Opinion for corresponding PCT Application No. PCT/GB2018/051453, mailed on May 2, 2019, 19 pages.

* cited by examiner

POSITION SENSING APPARATUS AND METHOD

PRIORITY CLAIM

This application is based upon and claims the right of priority under 35 U.S.C. § 371 to International Application No. PCT/GB2018/052978 filed on Oct. 16, 2018, which is incorporated by reference herein.

TECHNICAL FIELD

Example aspects of the present disclosure relate to inductive sensing of the relative rotary position between two members.

BACKGROUND

Various forms of inductive position sensor are known for detecting the position of a first member relative to a second member. In some instances, one member carries a transmit aerial and a receive aerial while the other member carries an intermediate coupling element. The transmit aerial and the receive aerial are arranged so that, in the absence of the intermediate coupling element, a magnetic field generated by alternating current flowing through the transmit aerial induces a null signal in the receive aerial (the transmit aerial and the receive aerial are then referred to as balanced). However, in the presence of the intermediate coupling element, a magnetic field generated by alternating current flowing through the transmit aerial induces an electromotive force in the receive aerial that generates a current that is dependent on the position of the intermediate coupling element relative to the transmit and receive aerials. By analysing this current, the relative position of the two members can be determined.

Integrated circuits for inductive position sensing are becoming commercially available, for example as Application Specific Standard Products. This availability improves the commercial viability of inductive position sensors by reducing cost. At present, these integrated circuits are designed for inductive position sensors in which the intermediate coupling element is in the form of a piece of conductive material or a conductive track formed in a loop.

SUMMARY

According to a first aspect, there is provided position sensing apparatus comprising a first member having an excitation conductive winding and a detection conductive winding formed thereon and a second member having a resonant circuit formed thereon. An integrated circuit comprising excitation signal generation and detection signal processing circuitry is arranged to generate an alternating excitation signal at a resonant frequency of the resonant circuit and to process an alternating detection signal induced in the detection conductive winding as a result of a magnetic field generated by the alternating excitation signal flowing through the excitation conductive winding, with the excitation conductive winding and the detection conductive winding being arranged so that the detection signal varies in dependence on the relative position of the first and second member. The position sensing apparatus further comprises phase-shift circuitry arranged to introduce a phase shift to one of the excitation signal and the detection signal such that the excitation signal output by the integrated circuit and the detection signal input to the detection circuit are in phase or in anti-phase with each other.

Further aspects are set out in the accompanying claims.

DETAILED DESCRIPTION

Figure 1:
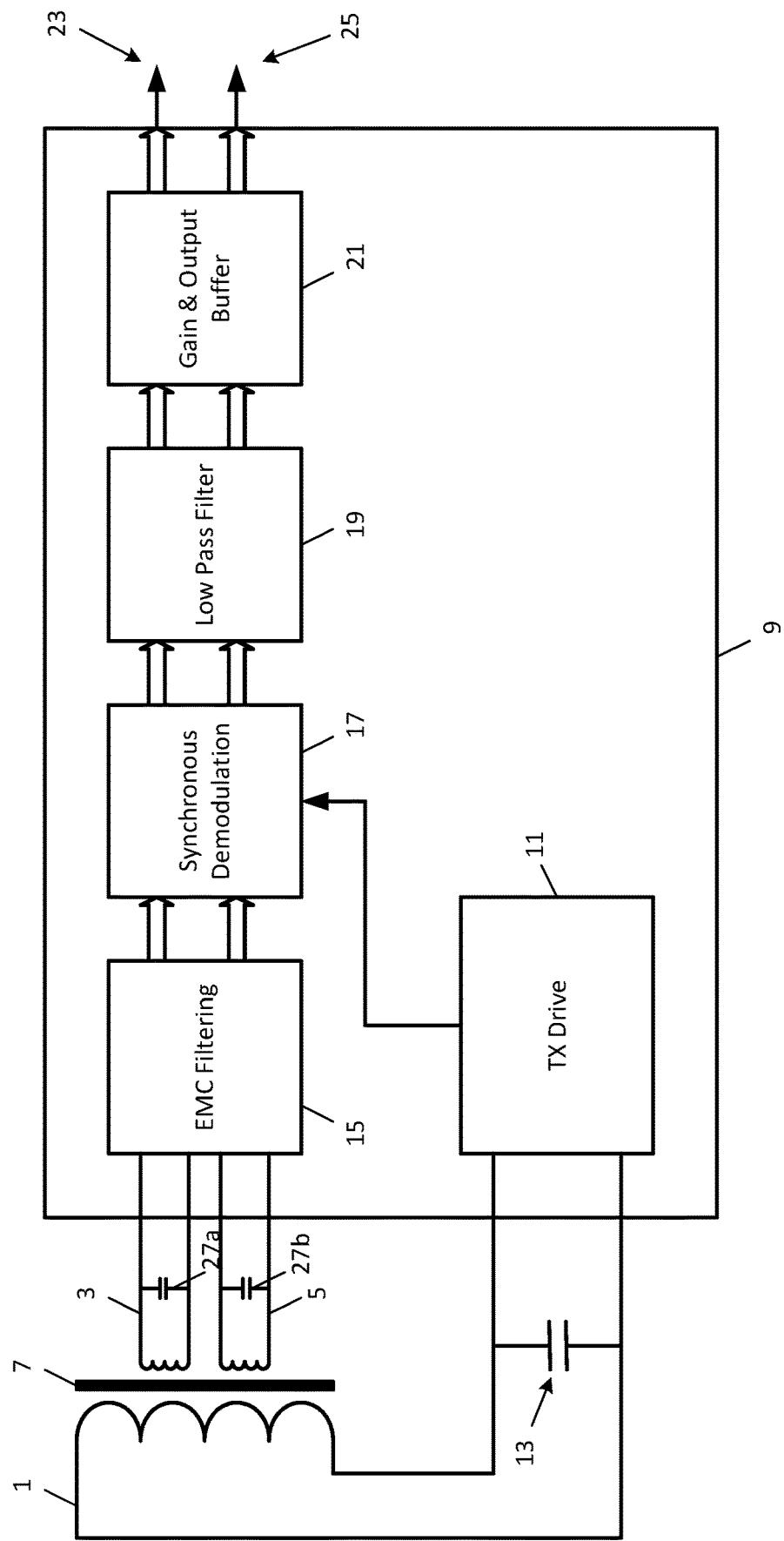
FIG. 1 schematically shows the main components of a first example of an inductive position sensor.

Example embodiment provide position sensing apparatus comprising a first member having an excitation conductive winding and a detection conductive winding formed thereon, and a second member having a resonant circuit formed thereon. An integrated circuit comprising excitation signal generation and detection signal processing circuitry is arranged to generate an alternating excitation signal at a resonant frequency of the resonant circuit and to process an alternating detection signal induced in the detection conductive winding as a result of a magnetic field generated by the alternating excitation signal flowing through the excitation conductive winding, wherein the excitation conductive winding and the detection conductive winding are arranged so that the detection signal varies in dependence on the relative position of the first and second member. Phase-shift circuitry is arranged to introduce a phase shift to one of the excitation signal and the detection signal such that the excitation signal output by the integrated circuit and the detection signal input to the detection circuit are in phase or in anti-phase with each other.

The detection conductive winding and the phase-shift circuitry may form a parallel-resonant circuit, which may comprise a capacitor in parallel with the detection conductive winding. The resonant frequency of the parallel-resonant circuit may substantially match the resonant frequency of the resonant circuit formed on the second member.

The phase shift circuitry may comprise a ninety-degree phase shift circuit between the detection conductive winding and the integrated circuit. Alternatively, the phase shift circuitry may comprise an inductor, an impedance buffer circuit and a ninety-degree phase shift circuit, the inductor being arranged to control a frequency of the excitation signal output by the integrated circuit, the impedance buffer circuit being arranged between the inductor and the ninety-degree phase shift circuit, and the ninety-degree phase shift circuit being arranged between the impedance buffer circuit and the detection conductive winding.

The detection conductive winding may be a first detection conductive winding and the detection signal is a first detection signal, and the position sensing apparatus may further comprise a second detection conductive winding arranged so that an alternating second detection signal is induced in the second detection conductive winding as a result of a magnetic field generated by the alternating excitation signal flowing through the excitation conductive winding, with the excitation conductive winding and the second detection conductive winding being arranged so that the detection signal varies in dependence on the relative position of the first and second member, and the integrated circuit being arranged to process the first detection signal and the second detection signal.

The integrated circuit may comprise synchronous demodulation circuitry. The integrated circuit may further comprises drive circuitry arranged to generate the excitation signal and a demodulation signal, the integrated circuit being arranged to supply the demodulation signal to the synchronous demodulation circuitry.

Example embodiments may also provide position sensing apparatus comprising a first member having an excitation conductive winding and a detection conductive winding formed thereon and a second member having a resonant circuit formed thereon. The excitation winding and the detection winding may have respective layouts arranged such that current flowing in the excitation conductive winding generates a signal in the detection conductive winding that is dependent on the relative positions of the first and second members, and the detection conductive winding may form part of a parallel resonant circuit.

The parallel-resonant circuit may comprise a capacitor in parallel with the detection conductive winding. The resonant frequency of the parallel-resonant circuit may substantially matches a resonant frequency of the resonant circuit formed on the second member.

The position sensing apparatus may further comprise an integrated circuit to supply an excitation signal to the excitation conductive winding and to process the signal in the detection conductive winding. The excitation signal may have a frequency substantially matching the frequency of the resonant circuit formed on the second member. The resonant frequency of the parallel-resonant circuit substantially matches a resonant frequency of the resonant circuit formed on the second member.

In this way, in example embodiments, the integrated circuit can be an integrated circuit designed for use with an intermediate coupling element in the form of a conductive material or a conductive track formed in a loop, rather than a resonant circuit.

Using a resonant circuit as the intermediate coupling element has several advantages. For example, the resonant circuit can increase the signal strength in the detection conductive winding, and can also provide a filtering effect to remove frequencies away from the resonant frequency.

In one example, the phase-shift circuitry forms, in combination with the detection conductive winding, a parallel resonant circuit. This can introduce a further filtering effect.

Further features and advantages of the present disclosure will become apparent from the following description of preferred embodiments, given by way of example only, which is made with reference to the accompanying drawings.

An inductive position sensor according to example embodiments of the present disclosure will now be described with reference to FIG. 1. As schematically shown in FIG. 1, in this example the inductive position sensor has a transmit aerial formed by an excitation winding 1, a receive aerial formed by a first detection winding 3 (hereafter referred to as the sine winding 3) and a second detection winding 5 (hereafter referred to as the cosine winding 5), and an intermediate coupling element 7. The transmit aerial and the receive aerial are formed on a first member (not shown) and the intermediate coupling element 7 is formed on a second member (also not shown) in such a manner that relative movement between the first member and the second member causes a corresponding relative movement (e.g., rotary movement) between, on the one hand, the transmit aerial and the receive aerial, and on the other hand, the intermediate coupling element.

The excitation winding 1, the sine winding 3 and the cosine winding 5 are each formed by a respective conductive winding, with the ends of each conductive winding electrically coupled to respective terminals of integrated circuit 9, such as an Application Specific Integrated Circuit (ASIC) or an Application Specific Standard Product (ASSP). As shown in FIG. 1, the integrated circuit 9 includes a TX drive stage 11 which generates an alternating electrical signal for supply to the transmit aerial. In this example, the TX drive stage 11 is a free running oscillator that generates an alternating electrical signal at a drive frequency determined by the inductance of the transmit aerial and the capacitance of a capacitor 13 connected in parallel to the excitation winding 1. In this example, the intermediate coupling element 7 is a resonant circuit and the drive frequency is set to the resonant frequency of that resonant circuit. Normally, the resonant frequency of the resonant circuit is designed to be a few MHz, for example in the range of about 1 MHz to about 6 MHz. As used herein, the use of the term "about" in conjunction with a numerical value is intended to refer to within 20% of the stated numerical value.

Supplying an alternating current to the excitation winding 1 induces electromotive forces in the sine winding 3 and the cosine winding 5, both directly and via the intermediate coupling element 7. As a result of the layout of the sine winding 3 and the cosine winding 5 with respect to the layout of the excitation winding 1, the forces induced directly in the sine winding 3 and the cosine winding 5 are balanced and therefore cause negligible current to flow in the sine winding 3 and the cosine winding 5. However, the electromotive forces induced via the intermediate coupling element 7 do cause current to flow in the sine winding 3 and the cosine winding 5. As shown in FIG. 1, the sine winding 3 and the cosine winding 5 are separate windings such that separate currents flow in the sine winding 3 and the cosine winding 5. The sine winding 3 and the cosine winding 5 are electrically coupled to separate terminals of the integrated circuit 9, with the current flowing in the sine winding 3 being processed to provide a sine output signal 23 and the current flowing in the cosine winding 5 being processed to provide a cosine output signal 25. The relative magnitudes of the sine output signal 23 and the cosine output signal 25 are indicative of the relative position of the first member and the second member.

On entering the integrated circuit 9, current flowing in the sine winding 3 first goes through an EMC filtering stage 15, to reduce signal components at frequencies away from the drive frequency. The filtered out signal components may be caused, for example, by interference from electrical signals generated by other nearby electrical components.

The filtered electrical signal then goes through a synchronous demodulation stage 17 in which the filtered electrical signal is mixed with a demodulation signal from the TX drive stage 11. The integrated circuit 9 is designed to be used with a non-resonant intermediate coupling element, and therefore the demodulation signal is in phase with the drive signal. As will be discussed in more detail hereafter, to enable the integrated circuit to be used with an intermediate coupling element in the form of a resonant circuit, the sine winding 3 forms part of a parallel resonant circuit so that the demodulated electrical signal resulting from the synchronous demodulation has a baseband component whose magnitude varies in dependence on the relative position of the first and second members and higher frequency components at twice the drive frequency and at higher harmonics of the drive frequency.

The demodulated electrical signal then passes through a low pass filtering stage 19 to remove the high frequency components corresponding to harmonics of the drive signal, leaving the baseband component, and then passes through gain and output buffer stage 21, which allows an adjustable gain to be applied before the sine output signal 23 is output by the processing circuitry 9.

As will be apparent from FIG. 1, current induced in the cosine winding 5 also undergoes EMC filtering 15, synchronous demodulation 17, low pass filtering 19 and gain and output buffering 21 within the processing circuitry 9, before being output as the cosine output signal 25. Again, the cosine winding 5 forms part of a parallel resonant circuit.

The excitation winding 1, the sine winding 3 and the cosine winding 5 are formed by conductive tracks arranged on the first member and the intermediate coupling element 7 is formed by a resonant circuit in an analogous manner to the conductive tracks and resonant circuit discussed in International patent publication WO 95/31696, the whole contents of which are hereby incorporated by reference. In example embodiments, each of the sine winding 3 and the cosine winding 5 are formed by a conductive track that follows a sinuous forward path along the first member until reaching, and then returns back along the first member following a sinuous return path to the starting end. For each of the sine winding 3 and the cosine winding 5, the respective sinusoidal forward and return paths have a common period and are in antiphase, i.e. they are substantially 180° out of phase. In this way, in effect a series of current loops is formed with the polarity of each current loop being opposite to that of its immediate neighbors. The excitation winding 1 runs around the periphery of the first member and may comprise a single loop of conductor or alternatively may comprise many turns of conductive wire.

As mentioned above, in the absence of the intermediate coupling element 7, the electromotive forces directly induced in the sine winding 3 by the magnetic field generated by the current flowing in the excitation winding 1 balance each other out such that no current flows in the sine winding 3 directly as a result of the magnetic field generated by the excitation winding 1. In a similar manner, in the absence of the intermediate coupling element 7, the electromotive forces directly induced in the cosine winding 5 by the magnetic field generated by current flowing in the excitation winding 1 balance each other out such that no current flows in the cosine winding 5 directly as a result of the magnetic field generated by the excitation winding 1.

The presence of the intermediate coupling element 7 has the effect of introducing a signal component in the sine winding 3 and the cosine winding 5 whose magnitude varies with the position of the intermediate coupling element 7 in a sinusoidal manner, with the sinusoidal variation with position in the sine winding 3 being 90° out of phase with the sinusoidal variation with position in the cosine winding 5.

As the intermediate coupling element 7 is a resonant circuit, the phase of the current induced in the intermediate coupling element is 90° out of phase from the current that would have been induced by a simple conductive loop or by eddy currents in a conductive material. This means that the sine winding 3 and the cosine winding 5 cannot simply be connected to the integrated circuit 9 because that would result in two signals substantially in phase quadrature being multiplied in the synchronous demodulation stage 17, resulting in substantially no signal being output from the synchronous demodulation stage 17. As mentioned above, to address this issue the sine winding 3 is made part of a parallel resonant circuit by connecting a first capacitor 27 $a$ in parallel with the sine winding 3 across respective input terminals of the integrated circuit 9. By matching the resonant frequency of the parallel resonant circuit to the resonant frequency of the resonant circuit of the intermediate coupling element 7, the voltage signal across the terminal is in phase or in anti-phase with the excitation signal. In a similar manner, the cosine winding 5 is made part of a parallel resonant circuit by connecting a second capacitor 27 $b$ in parallel with the cosine winding 5 across respective input terminals of the integrated circuit 9.

A second example will now be described with reference to FIGS. 2 and 3. In this second example, instead of making the sine winding 3 and the cosine winding 5 components of respective parallel resonant circuits, the phase of the excitation signal is shifted by 90° before being supplied to the excitation winding 1.

Figure 2:
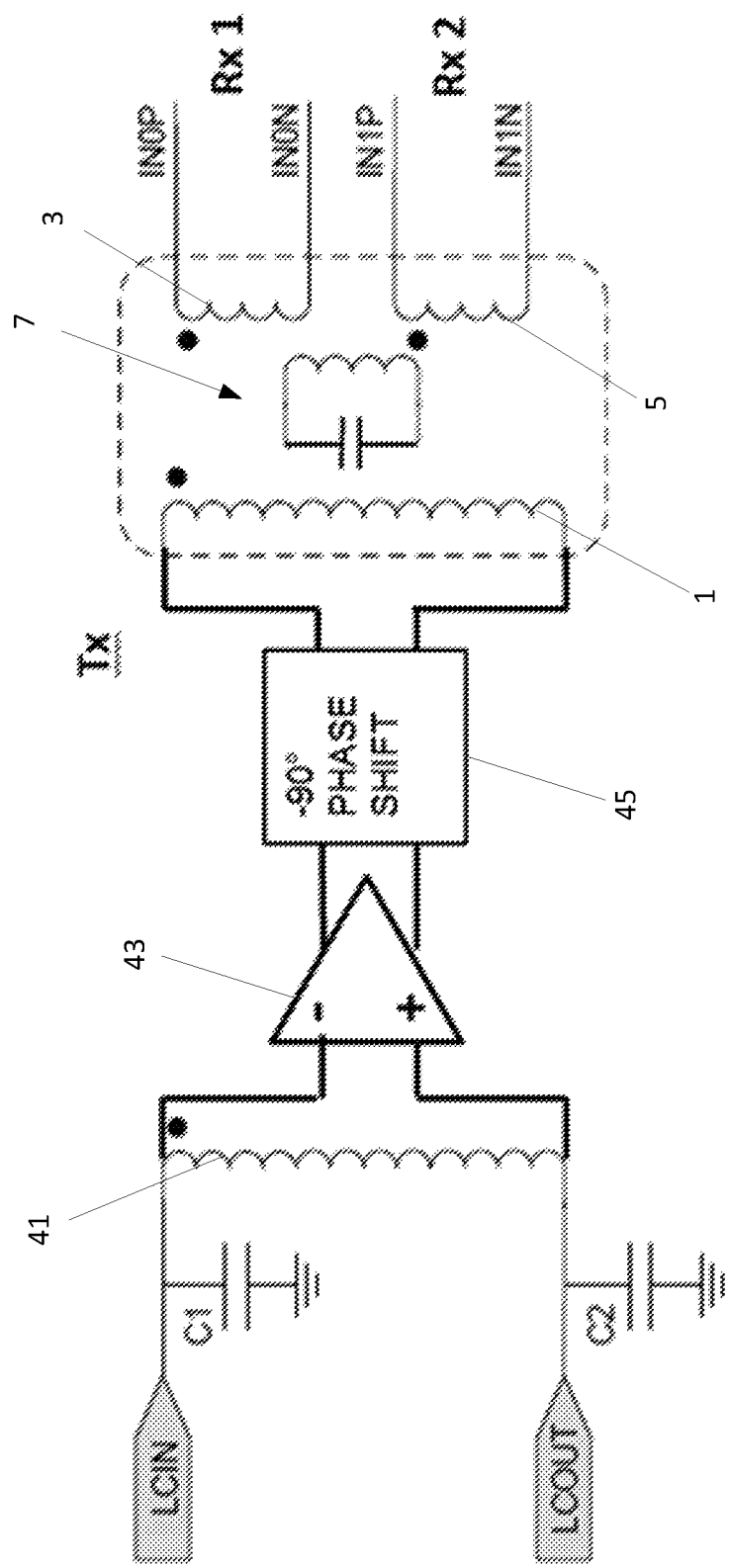
FIG. 2 is a circuit diagram showing components of a second example of a position sensor.
Figure 3:
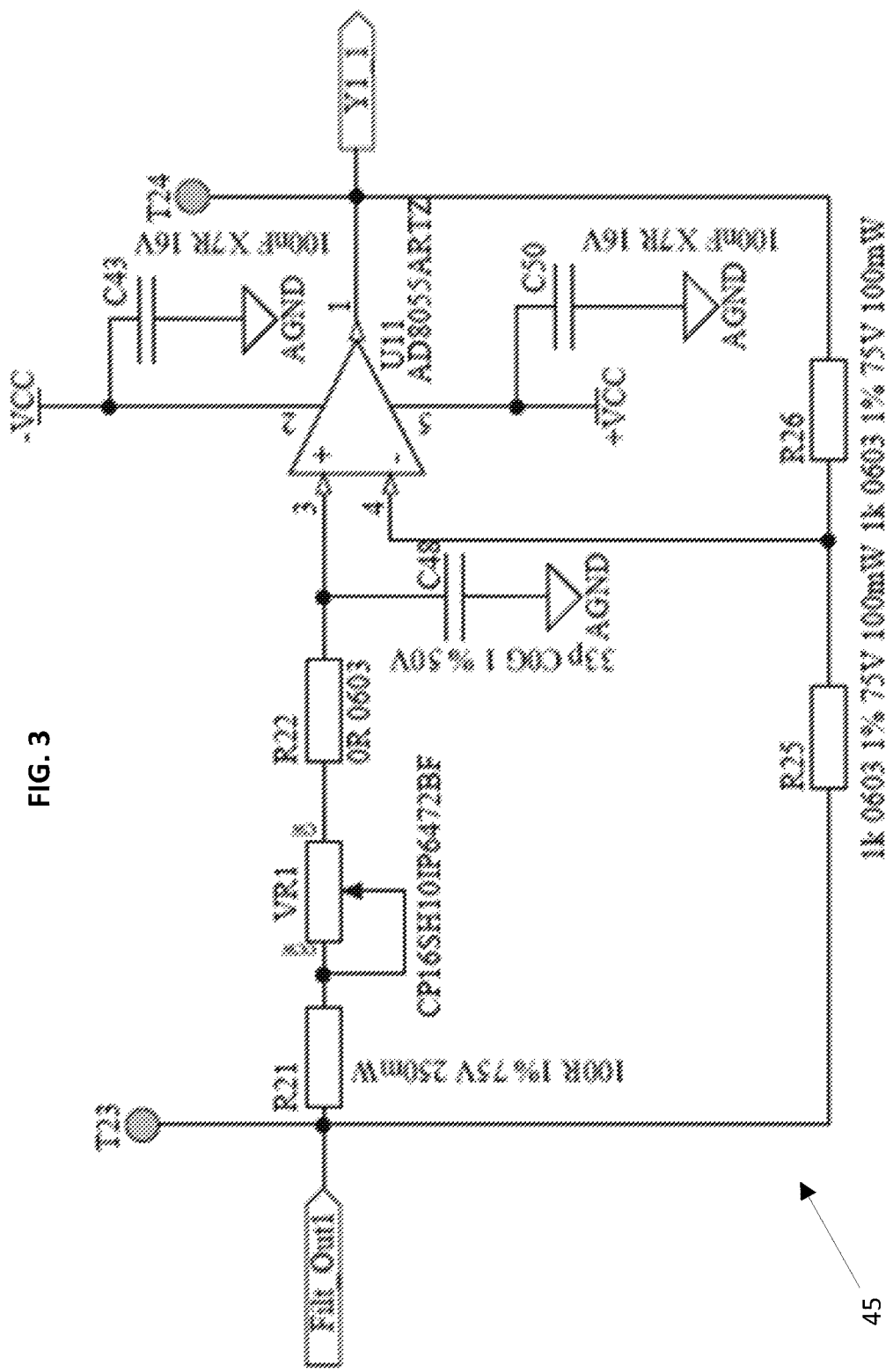
FIG. 3 is a circuit diagram for a 90° phase shift circuit forming part of the circuitry illustrated in FIG. 2.

FIG. 2 shows the components of the inductive position sensor other than the integrated circuit (which is the same integrated circuit as in the example illustrated in FIG. 1), which is represented by the terminals LCIN and LCOUT for supplying the excitation signal and the terminals IN0P and IN0N for receiving the detection signal from the sine winding 3 and the terminals IN1P and IN1N for receiving the detection signal from the cosine winding 5.

As shown in FIG. 2, an inductor 41 is connected across the terminals LCIN and LCOUT. The inductor 41, in conjunction with the capacitors C1 and C2, set the frequency of the excitation signal to the same frequency as the resonant frequency of the resonant circuit 7. The excitation signal then passes through a high impedance buffer circuit 43 so that the subsequent circuitry does not affect the excitation signal output by the integrated circuit 9.

The output of the buffer circuit 43 is input to a 90° phase shift circuit 45, which shifts the phase of the excitation signal by 90° prior to applying the excitation signal to the excitation winding 1. FIG. 3 shows an example circuit for the 90° phase shift circuit 45, in particular an all-pass filter including a logarithmic potentiometer VR1 that can be adjusted to achieve a 90° phase shift at the frequency of the excitation signal. It will be appreciated that other forms of phase shift circuitry could be used.

The signals induced in the sine winding 3 and the cosine winding 5 are then directly input to the respective terminals of the integrated circuit 9, as those signals will either be in phase or in anti-phase with the excitation signal as output by the integrated circuit 9.

Figure 4:
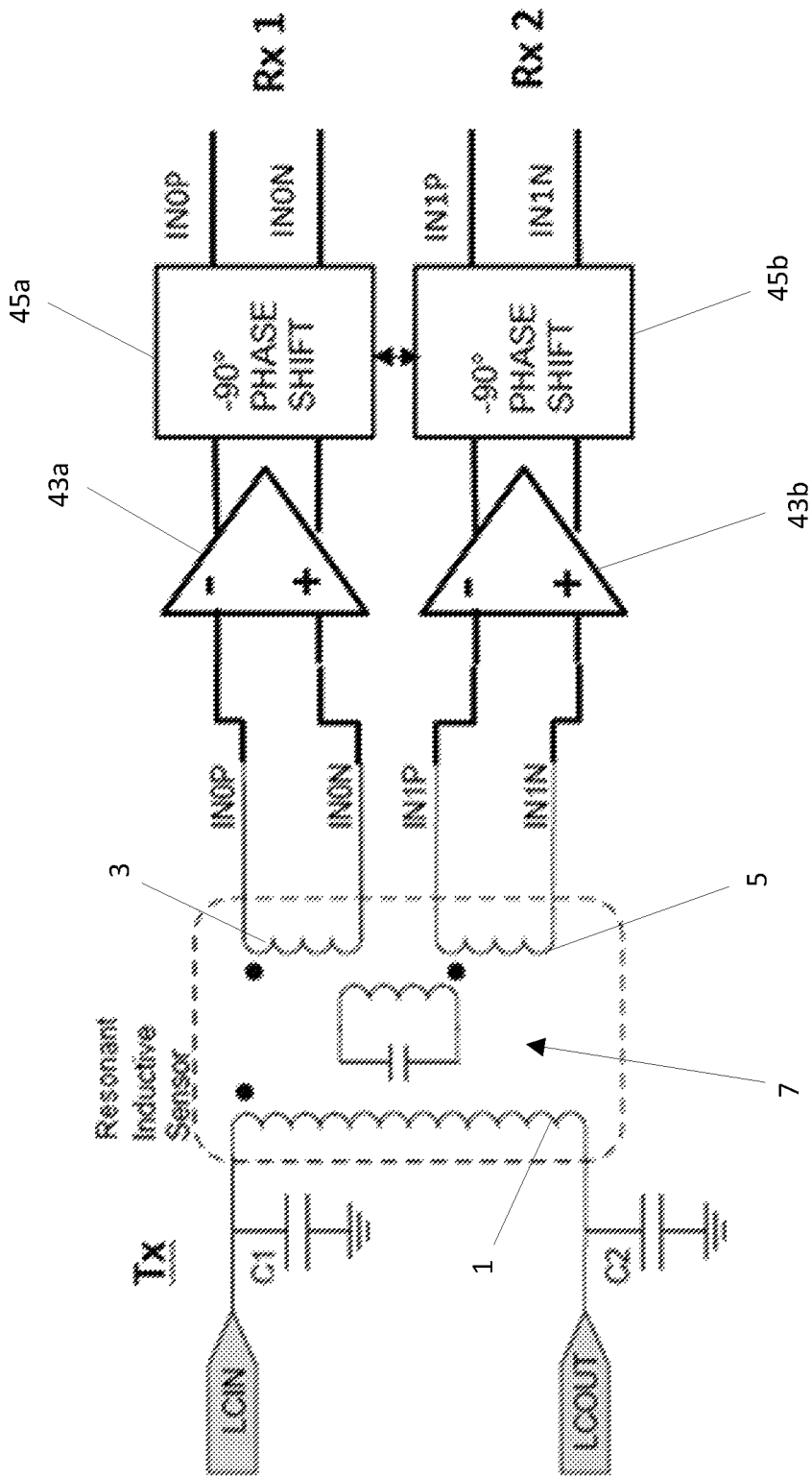
FIG. 4 is a circuit diagram showing components of a third example of a position sensor.

In the second example, a 90° phase shift is introduced to the excitation signal output by the integrated circuit 9 prior to being applied to the excitation winding 1. FIG. 4 shows a third example in which a 90° phase shift is introduced to the signal induced in the sine winding and the signal introduced to the cosine winding.

As shown in FIG. 4, the signal induced in the sine winding 3 is input to a first buffer circuit 43$a$, and the output of the first buffer circuit 43$a$ is input to a first 90° phase shift circuit 45$a$. Similarly, the signal induced in the cosine winding 5 is input to a second buffer circuit 43$b$, and the output of the second buffer circuit 43$b$ is input to a second 90° phase shift circuit 45$b$. In this example, the first and second 90° phase shift circuits are the same as the 90° phase shift circuit illustrated in FIG. 3, although it will be appreciated that alternative forms of phase shift circuitry could be used. By introducing the 90° phase shift into the signals induced in the sine winding 3 and the cosine winding 5, the signals detected by the integrated circuit 9 are in phase or in anti-phase with the excitation signal of the integrated circuit 9.

Although in all the examples given above the receive aerial has both a sine winding and a cosine winding, this is not essential and just one of the sine winding and the cosine winding could be used. In such arrangements, a feedback signal could be utilised to vary the magnitude of the oscillating drive current applied to the transmit aerial so that position information can be derived from just the current flowing in the single sine/cosine winding. The above embodiments are to be understood as illustrative examples of the present disclosure.

Further embodiments of the present disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Position sensing apparatus comprising:
   a first member having an excitation conductive winding and a detection conductive winding formed thereon;
   a second member having a resonant circuit formed thereon;
   an integrated circuit comprising excitation signal generation and detection signal processing circuitry arranged to generate an alternating excitation signal at a resonant frequency of the resonant circuit and to process an alternating detection signal induced in the detection conductive winding as a result of a magnetic field generated by the alternating excitation signal flowing through the excitation conductive winding, wherein the excitation conductive winding and the detection conductive winding are arranged so that the detection signal varies in dependence on the relative position of the first and second member; and
   phase-shift circuitry arranged to introduce a phase shift to one of the excitation signal and the detection signal such that the excitation signal output by the integrated circuit and the detection signal input to the detection circuit are in phase or in anti-phase with each other, the phase-shift circuitry comprising an impedance buffer circuit, a ninety-degree phase shift circuit, and an inductor arranged to control a frequency of the excitation signal output by the integrated circuit;
   wherein the impedance buffer circuit is arranged between the inductor and the ninety-degree phase shift circuit, and the ninety-degree phase shift circuit is arranged between the impedance buffer circuit and the excitation conductive winding.

2. Position sensing apparatus according to claim 1, wherein the phase shift circuitry comprises a ninety-degree phase shift circuit between the detection conductive winding and the integrated circuit.

3. Position sensing apparatus according to claim 1, wherein the detection conductive winding is a first detection conductive winding and the detection signal is a first detection signal,
   wherein the position sensing apparatus further comprising a second detection conductive winding arranged so that an alternating second detection signal is induced in the second detection conductive winding as a result of a magnetic field generated by the alternating excitation signal flowing through the excitation conductive winding,
   wherein the excitation conductive winding and the second detection conductive winding are arranged so that the detection signal varies in dependence on the relative position of the first and second member, and
   wherein the integrated circuit is arranged to process the first detection signal and the second detection signal.

4. Position sensing apparatus according to claim 1, wherein the integrated circuit comprises synchronous demodulation circuitry.

5. Position sensing apparatus according to claim 4, wherein the integrated circuit further comprises drive circuitry arranged to generate the excitation signal and a demodulation signal,
   wherein the integrated circuit is arranged to supply the demodulation signal to the synchronous demodulation circuitry.

6. Position sensing apparatus comprising:
   a first member having an excitation conductive winding and a detection conductive winding formed thereon, the excitation winding and the detection winding having respective layouts arranged such that current flowing in the excitation conductive winding generates a signal in the detection conductive winding;
   an integrated circuit configured to process the signal in the detection conductive winding;
   a second member having a resonant circuit formed thereon;
   phase-shift circuitry comprising an impedance buffer circuit, a ninety-degree phase shift circuit, and an inductor, wherein the impedance buffer circuit is arranged between the inductor and the ninety-degree phase shift circuit, and the ninety-degree phase shift circuit is arranged between the impedance buffer circuit and the excitation conductive winding;
   wherein the signal generated in the detection conductive winding is dependent on the relative positions of the first and second members; and
   wherein the detection conductive winding forms part of a parallel resonant circuit.

7. Position sensing apparatus according to claim 6, wherein the parallel-resonant circuit comprises a capacitor in parallel with the detection conductive winding.

8. Position sensing apparatus according to claim 7, wherein a resonant frequency of the parallel-resonant circuit substantially matches a resonant frequency of the resonant circuit formed on the second member.

9. Position sensing apparatus according to claim 6, the integrated circuit being further configured to supply an excitation signal to the excitation conductive winding,
   wherein the inductor is arranged to control a frequency of the excitation signal output by the integrated circuit.

10. Position sensing apparatus according to claim 9, wherein the excitation signal has a frequency substantially matching the frequency of the resonant circuit formed on the second member.

11. Position sensing apparatus according to claim 10, wherein a resonant frequency of the parallel-resonant circuit substantially matches a resonant frequency of the resonant circuit formed on the second member.

* * * * *